Patented June 11, 1935

2,004,130

UNITED STATES PATENT OFFICE 2,004,130

CYANIDE PROCESS AND THE PRODUCT

Edward J. Pranke, Great Barrington, Mass., assignor to E. I. du Pont de Nemours & Company, Inc., a corporation of Delaware No Drawing. Application July 16, 1932, Serial No. 623,026

16 Claims. (Cl. 23—79)

This invention relates to a new cyanide product and to methods of producing and treating the same, and is a continuation in part of my co-pending application, Serial No. 472,482, filed August 1, 1930, now Patent No. 1,947,570, issued February 20, 1934.

Objects of the invention are the provision of new and improved methods of producing and treating cyanides, and the production of a novel cyanide product.

I have discovered that if the elements calcium, sodium, carbon and nitrogen are alone present in a reaction zone in the proportions of one atom of calcium, two atoms of sodium, four atoms of carbon and four atoms of nitrogen, and are intimately mixed and heated to a temperature above 1350° C., preferably 1400°–1450° C., these elements will combine according to the equations hereinafter given into a cyanide product stable at these temperatures.

The product is a new composition, consisting principally of calcium sodium cyanide, which my experience shows to be a double salt having the chemical formula $CaNa_2(CN)_4$, mixed with a small percentage of sodium cyanide, both of which are water-soluble, and water-insoluble impurities of which the greater part is calcium oxid. While the double salt may be a calcium sodium cyanide, or potassium calcium cyanide, or sodium barium cyanide, or potassium barium cyanide, or a similar compound of alkali metal, alkaline earth metal and cyanide radical, calcium sodium cyanide is the most important commercial product because of its lower cost of production, and for this reason I shall describe my invention in connection with this compound and the production and treatment of the composition of matter composed principally of that compound.

In producing this new composition of matter I may utilize elementary calcium, sodium, carbon and nitrogen, or I may derive these elements from the decomposition of compounds containing them.

As sources of calcium I may use elementary calcium, calcium carbid, calcium cyanamid, calcium nitrid, or in fact, any material which under the conditions described will produce calcium or calcium carbid.

As sources of carbon, I may use elementary carbon, or calcium carbid, or calcium cyanamid, or other materials which under the conditions described will produce carbon or carbids.

As sources of nitrogen, I may use elementary nitrogen, calcium cyanamid, calcium nitrid, or other materials which under the conditions described will produce elementary nitrogen.

As sources of alkali metal I may use the alkali metal itself or a cyanide thereof.

For example, I have found that calcium sodium cyanide may be formed at the temperatures named using as raw materials crude calcium cyanamid and sodium cyanide, in accordance with the reaction (1) $CaCN_2 + C + 2NaCN = CaNa_2(CN)_4$.

It may be noted that the free carbon in the above equation is that which is present in crude cyanamid produced according to the reaction:—

(2) $CaC_2 + N_2 = CaCN_2 + C$.

I have also carried out the reaction (3) $CaC_2 + N_2 + 2NaCN = CaNa_2(CN)_4$ with a high degree of efficiency.

In the foregoing reactions (1) and (3) the sodium element is obtained from sodium cyanide, which I prefer because it is cheaper than metallic sodium, but the metal itself may be combined with calcium cyanamid, as follows:—

(4) $2(CaCN_2 + C) + 2Na = CaNa_2(CN)_4 + Ca$ or combined with calcium carbid, carbon and nitrogen, as follows:—

(5) $CaC_2 + 2C + 2Na + 2N_2 = CaNa_2(CN)_4$.

In all cases, the proportions of materials used are to be calculated on the basis of the chemical reactions given, except that when free nitrogen is used I prefer to use an excess and waste a portion thereof.

One of the most important advantages of my process and product is that none of the foregoing reactions involves or depends on the use of a chlorid such as sodium chlorid, NaCl, or materials which produce a chlorid. I need no fluxes in my process. The freedom of my product from material used as fluxes and especially from chlorids, which are water-soluble, gives me a furnace product of which the greater part is composed of water-solubles consisting of cyanides only and of which the remainder consists of water-insolubles derived from the insoluble impurities contained in the raw materials. Commercial calcium cyanamid contains free carbon and calcium oxid in substantial amounts, and other insoluble impurities in smaller amounts. Most of the free carbon is utilized in making the cyanide, while the balance, together with the calcium oxid and other insoluble impurities, appears in the product without substantial change. The reactions by which the double salt may be obtained are, like most chemical reactions when carried out on a commercial scale, not 100% perfect or complete. A small percentage of sodium cyanide therefore may be present in my new product. The product therefore consists of solubles, which are cyanides only, of which the greater and most important part is sodium calcium cyanide, and of insolubles which are calcium oxid and other impurities.

Suitable apparatus for the practice of my improved process may comprise a rotary furnace of the horizontally inclined type or an electric fusion type of furnace. Volatile substances escaping from the reaction zone may be passed through interstices in the cold incoming charge, whereby they will be condensed and returned to the reaction zone.

Although calcium sodium cyanide is stable at the temperatures of formation as given above and at temperatures below about 350° C., it is unstable at intermediate temperatures between these limits. To avoid decomposition it is therefore important that the furnace product be cooled as rapidly as possible from the temperature of its formation to a temperature below about 350° C. This may be accomplished by causing a stream of the molten cyanide, tapped from the furnace in which it is formed, to impinge upon a cooled surface moving in relation to the said stream in such a way that by the combined force of gravity and the motion of the moving surface the molten cyanide will be spread in a thin sheet or layer, as fully described and claimed in my co-pending application, Ser. No. 568,517, filed October 12, 1931. By this means the cyanide will be very rapidly cooled and solidified on the moving surface, from which it may be scraped in thin flakes.

I am satisfied that the principal ingredient of my product, calcium sodium cyanide, is a chemical compound and not a mixture of the single salts, calcium cyanide and sodium cyanide, because I have found by extensive tests that it reacts differently from the single salts or a mixture of the latter when subjected to the same conditions, such for example as heating to a temperature of 1400° C. I have also found that the double salt has a fixed invariable composition corresponding to exact or multiple atomic proportions. This is not true of a mixture of the single salts.

My new product, containing calcium sodium cyanide as its principal ingredient, produced according to the methods above described, may be used as such, or substantially pure sodium cyanide may be produced therefrom.

The production of substantially pure sodium cyanide from my product may be best accomplished by either of two methods, one involving the use of liquid anhydrous ammonia, or the other involving the use of water as a solvent. In either case, the only ingredients that go into solution are cyanides, which can later be recovered therefrom in a substantially pure state. This is a great advantage because, if other solubles were present, such as chlorids, it would be very difficult and costly, as is well known in the art, effectively to separate the cyanides from the chlorids.

Crude calcium sodium cyanide dissociates in liquid anhydrous ammonia, and upon dissociation sodium cyanide passes into solution in the ammonia while calcium cyanide and other forms of calcium present remain insoluble. The solution may be readily separated from the insolubles by filtration and the ammonia evaporated from the solution, leaving substantially pure sodium cyanide. The ammonia may likewise be evaporated from the insoluble residue, leaving a product containing a large percentage of calcium cyanide, which may be used as such as a fumigating material, or may be converted to sodium cyanide (for example, by double decomposition with sodium carbonate, sodium hydrate, sodium oxalate or other suitable salts) or may be converted to other cyanide derivatives.

The ammonia evaporated as described may, of course, be recondensed and used again.

I may produce sodium cyanide from calcium sodium cyanide by mixing therewith sufficient sodium carbonate to provide total sodium equivalent to the cyanide radical combined with calcium. In aqueous solution the calcium ion will be precipitated as insoluble calcium carbonate leaving all the cyanide in the form of sodium cyanide. A small quantity of basic lead carbonate may be added to precipitate any sulphides present. The aqueous sodium cyanide solution may be used to extract a second mix of crude furnace product and soda ash, giving a saturated or nearly saturated solution of sodium cyanide.

After filtration, the strong sodium cyanide solution may be cooled to 5 or 10° C. and sodium cyanide dihydrate ($NaCN.2H_2O$) will crystallize out. The crystals may be filtered off or centrifuged out and the remaining liquor may be used to extract another mix of crude furnace product and soda ash. The crystals may be recrystallized if necessary. They may then be put into solution by dissolving them in a minimum amount of water, or if heated to 34° C. they will dissolve in their own water of crystallization. The water, in any event, must be rapidly removed from the sodium cyanide solution if decomposition is to be avoided. This may be accomplished by applying this solution on a rotating heated drum from which the solid residue of sodium cyanide may be scraped.

Of the sodium cyanide recovered, I may use a portion as a raw material for the furnace charge.

It is seen from the reactions given that my invention provides a means of producing a crude cyanide product without the use of a chlorid, such as sodium chlorid, commonly used in the prior art, and, therefore, I am enabled to obtain such a product free from chlorids, with the following important advantages: Such chlorid-free product may contain as high as 42 to 46 percent cyanogen, equivalent to 80 to 88 percent sodium cyanide. This is a very high percentage as compared with the 48 to 49.5 percent equivalent sodium cyanide found in commercial crude cyanide as at present manufactured from calcium cyanamid and sodium chlorid. The leaching of my chlorid-free crude product with anhydrous ammonia, or its conversion with sodium carbonate in aqueous solution, and the preparation therefrom of a practically pure sodium cyanide is very easily carried out. This is in striking contrast to the practically prohibitive difficulties encountered in the attempted separation of cyanide from chlorids either with anhydrous ammonia or in aqueous solution.

I claim:

1. The process of producing crude cyanide which consists in bringing into a reaction zone heated above 1350° C. elementary calcium, carbon, sodium and nitrogen in the proportions of one atom of calcium, four of carbon, two of sodium and four of nitrogen, the mixture being free from chlorids, causing such motion of the solid and liquid substances as will result in bringing all portions thereof into contact with the gases present, passing the gases leaving the reaction zone through interstices in the incoming solid materials, returning the condensed substances into the reaction zone, until substantial completion of the reactions forming cyanide, removing the fused product, and rapidly cooling said product.

2. The process of producing cyanide which consists in bringing into a reaction zone heated above 1350° C. materials substantially free from chlorids and capable of generating elementary calcium, carbon, sodium and nitrogen, said materials being provided in such proportion as to generate the said elements in the proportion of one atom of calcium, four of carbon, two of sodium and four of nitrogen, bringing all portions of the solid and liquid substances into contact with the gases present until substantial completion of the reactions forming cyanide, and rapidly cooling the fused product.

3. The process of producing calcium sodium cyanide which consists in rapidly heating crude calcium cyanamid in the presence of sodium cyanide to a temperature of approximately 1,400° C. and rapidly cooling, the sodium cyanide being provided substantially in the proportions of one atom of sodium to each atom of nitrogen provided by the cyanamid.

4. The process of producing calcium sodium cyanide which consists in rapidly heating crude calcium cyanamid in the presence of sodium to a temperature of approximately 1,400° C. and rapidly cooling.

5. The process of producing calcium sodium cyanide which consists in rapidly heating crude calcium cyanamid in the presence of sodium at a temperature above approximately 1,350° C. and rapidly cooling, the sodium being provided substantially in the proportions of two atoms of sodium to each four atoms of nitrogen provided by the cyanamid.

6. The process of producing sodium cyanide which consists in rapidly heating to substantially 1,400° C. a mixture of crude calcium cyanamid and sodium cyanide to form calcium sodium cyanide, rapidly cooling the same, mixing with liquid anhydrous ammonia, separating the solution from the insolubles, separating the contained sodium cyanide from the solvent, evaporating the ammonia from the insolubles and converting the calcium cyanide therein to sodium cyanide by suitable means and recovering the latter from solution.

7. The process of producing sodium cyanide which consists in forming calcium sodium cyanide by rapidly heating to substantially 1,400° C. a mixture of crude calcium cyanamid and sodium cyanide, rapidly cooling, adding sodium carbonate and water, filtering and recovering sodium cyanide from the solution by suitable means.

8. The process of producing calcium sodium cyanide which consists in bringing into a reaction zone heated above 1,350° C. calcium carbid, carbon, sodium and nitrogen in the proportions of one molecule of calcium carbid, two atoms of carbon, two of sodium and four of nitrogen, causing such motion of the solid and liquid substances as will result in bringing all portions thereof into contact with the gases present, passing the gases leaving the reaction zone through interstices in the incoming solid materials, returning the condensed substances into the reaction zone, until substantial completion of the reactions forming cyanide, removing the fused product, and rapidly cooling said product.

9. The process of producing calcium sodium cyanide which consists in bringing into a reaction zone heated above 1,350° C. calcium carbid, sodium cyanide and nitrogen in the proportions of one molecule of calcium carbid, two molecules of sodium cyanide and two atoms of nitrogen, causing such motion of the solid and liquid substances as will result in bringing all portions thereof into contact with the gases present, passing the gases leaving the reaction zone through interstices in the incoming solid materials, returning the condensed substances into the reaction zone, until substantial completion of the reactions forming cyanide, removing the fused product, and rapidly cooling said product.

10. The cyclical process of producing sodium cyanide which consists in heating sodium cyanide intermingled with crude calcium cyanamid to a temperature of about 1,400° C., rapidly cooling the reaction product, adding thereto sodium carbonate in sufficient amount to provide total sodium equivalent to the total cyanogen present, leaching out sodium cyanide with water, recovering sodium cyanide from the solution by suitable means, and using a portion thereof to repeat the operations described.

11. The process of producing sodium cyanide which consists in forming calcium sodium cyanide by rapidly heating to substantially 1400° C., a mixture of crude calcium cyanamid and sodium, rapidly cooling, adding sodium carbonate and water, filtering and recovering sodium cyanide from the solution.

12. The process of producing sodium cyanide which consists in forming calcium sodium cyanide, adding sodium carbonate and water to form a solution of sodium cyanide, rapidly removing the water from the said cyanide by applying the solution to the surface of a rotating heated drum and removing the solid residue of sodium cyanide therefrom.

13. A cyanide product containing calcium sodium cyanide, $CaNa_2(CN)_4$, and substantially free from water-soluble materials other than cyanides.

14. As a composition of matter, a cyanide product comprising principally calcium sodium cyanide, $CaNa_2(CN)_4$, mixed with sodium cyanide, calcium oxid and minor impurities and substantially free from chlorides.

15. As a new composition of matter, a cyanide product containing calcium, sodium, carbon and nitrogen combined in the proportions of one atom of calcium, two of sodium, four of carbon and four of nitrogen, and substantially free from water soluble materials other than cyanides.

16. The process of producing calcium sodium cyanide which consists in rapidly heating crude calcium cyanamid in the presence of sodium cyanide to a temperature above approximately 1350° C. and rapidly cooling, the sodium cyanide being provided substantially in the proportions of one atom of sodium to each atom of nitrogen provided by the cyanamid.

EDWARD J. PRANKE.